US008055787B2

(12) United States Patent
Victor et al.

(10) Patent No.: US 8,055,787 B2
(45) Date of Patent: Nov. 8, 2011

(54) SYSTEM AND METHOD FOR MANAGING INDUSTRIAL PROCESS CONTROL DATA STREAMS OVER NETWORK LINKS

(75) Inventors: Hendrik Johannes Victor, Rancho Santa Margarita, CA (US); Mikhail Avergun, San Diego, CA (US)

(73) Assignee: Invensys Systems, Inc., Foxboro, MA (US)

( * ) Notice: Subject to any disclaimer, the term of this patent is extended or adjusted under 35 U.S.C. 154(b) by 1562 days.

(21) Appl. No.: 10/938,209

(22) Filed: Sep. 10, 2004

(65) Prior Publication Data

US 2006/0059268 A1    Mar. 16, 2006

(51) Int. Cl.
*G06F 15/173*    (2006.01)
*G06F 3/00*    (2006.01)
(52) U.S. Cl. .............. 709/238; 710/52; 710/53; 710/54; 710/55; 710/56
(58) Field of Classification Search .................. 709/238; 710/52–57
See application file for complete search history.

(56) References Cited

U.S. PATENT DOCUMENTS

| 6,405,258 | B1 * | 6/2002 | Erimli et al. ................... | 709/235 |
|---|---|---|---|---|
| 2003/0079018 | A1 * | 4/2003 | Lolayekar et al. ............. | 709/226 |
| 2003/0126200 | A1 * | 7/2003 | Wolff .............................. | 709/203 |
| 2003/0135575 | A1 * | 7/2003 | Marejka et al. ................ | 709/207 |
| 2003/0135639 | A1 * | 7/2003 | Marejka et al. ................ | 709/232 |
| 2003/0140150 | A1 * | 7/2003 | Kemp et al. .................... | 709/229 |

FOREIGN PATENT DOCUMENTS

EP    0 652 683    5/1995

OTHER PUBLICATIONS

International Search Report dated Nov. 21, 2006.
Written Opinion of the International Searching Authority dated Sep. 8, 2006.
Supplementary European Search Report for EP 05 79 6133 dated Jun. 16, 2011.

* cited by examiner

*Primary Examiner* — John Follansbee
*Assistant Examiner* — Alan Chou
(74) *Attorney, Agent, or Firm* — Leydig Voit & Mayer, Ltd

(57) ABSTRACT

A data acquisition service on a network node is disclosed for forwarding received process data to a process history database over a potentially slow and/or intermittent network connection. A store and forward functionality within the networked node receives incoming process data via a first network interface and forwards outgoing process data via a second network interface. The disclosed store and forward functionality includes an immediate transmission cache and a store and forward storage. The store control enters, in response to detecting an entry condition, an activated mode wherein incoming process data is directed to the store and forward storage. A read control forwards outgoing process data to the second network interface from the immediate transmission cache and store and forward storage. The read control includes at least a first configurable parameter that constrains a rate at which data retrieved from the store and forward storage is forwarded via the second network interface.

33 Claims, 3 Drawing Sheets

SYSTEM AND METHOD FOR MANAGING INDUSTRIAL PROCESS CONTROL DATA STREAMS OVER NETWORK LINKS

TECHNICAL FIELD

The present invention generally relates to computing and networked data storage systems, and, more particularly, to techniques for storing streams of supervisory process control and manufacturing information. Such information is typically rendered and stored in the context of supervising automated industrial processes.

BACKGROUND

Industry increasingly depends upon highly automated data acquisition and control systems to ensure that industrial processes are run efficiently and reliably while lowering their overall production costs. Data acquisition begins when a number of sensors measure aspects of an industrial process and periodically report their measurements back to a data collection and control system. Such measurements come in a wide variety of forms. By way of example the measurements produced by a sensor/recorder include: a temperature, a pressure, a pH, a mass/volume flow of material, a tallied inventory of packages waiting in a shipping line, or a photograph of a room in a factory. Often sophisticated process management and control software examines the incoming data associated with an industrial process, produces status reports, and, in many cases, responds by sending commands to actuators/controllers that adjust the operation of at least a portion of the industrial process. The data produced by the sensors also allow an operator to perform a number of supervisory tasks including: tailor the process (e.g., specify new set points) in response to varying external conditions (including costs of raw materials), detect an inefficient/non-optimal operating condition and/or impending equipment failure, and take remedial action such as move equipment into and out of service as required. A simple and familiar example of a data acquisition and control system is a thermostat-controlled home heating/air conditioning system. A thermometer measures a current temperature, the measurement is compared with a desired temperature range, and, if necessary, commands are sent to a furnace or cooling unit to achieve a desired temperature.

Typical industrial processes are substantially more complex than the above-described simple thermostat example. In fact, it is not unheard of to have thousands of sensors and control elements (e.g., valve actuators) monitoring/controlling all aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. When multiplied by thousands of sensors/control elements, this results in so much data flowing into the control system that sophisticated data management techniques are required. One currently popular technique is "data streaming." Here, incoming data are stored, in order of arrival time, in one or more data files. Storing data in time-sequential order allows the control system to quickly access a set of data relevant to the state of a process at a particular time and to make an analysis of this snapshot accordingly.

It is generally desirable to provide as much streaming data as possible to linked (i.e., downstream) data recipients. Once streaming data has been filtered or dropped by an intermediate node, such as an I/O or data acquisition server, it is lost for any subsequent, intended downstream recipients of the data. It is further noted that such data streams are present within a variety of different process control management networks having differing throughput capabilities, connectivity, and reliability. In some networks, the links through which the streaming data passes are fast and always operational. However, in other networks one or more links are relatively slow and/or experience intermittent loss of connections. As a result, providing large quantities of streaming process data to an intended data sink can pose a challenge in the case of certain process management and control network topologies where one or more links in a data stream's path comprise slow and/or intermittent connections. Such challenges can arise in any of a variety of situations including, by way of example: an intermittent connection that has temporarily been suspended, a network interface (e.g., a dialup modem) having a low bandwidth, and multiple application-level processes simultaneously passing data to a single shared network hardware interface for transmission over a network.

For network topologies containing slow/intermittent connections or links, in cases where bursts of data temporarily exceed throughput (including zero throughput for a temporarily down intermittent connection/link), known data acquisition services enter a "store and forward" mode when a data transmission cache reaches a particular level of fullness (measured, for example, by quantity and/or transmission delay). Upon initiation of the store and forward mode, the entire contents of the data transmission cache are moved to the store and forward buffer. Subsequently received data is temporarily re-routed to the store and forward buffer rather than being immediately passed to the data transmission cache for transmission over a network via the slow/intermittent connection.

In such known systems, when the system senses that the network connection is available for forwarding data, data from both the store and forward buffer and the data transmission cache are transmitted over the network connection. In a known system separate threads for the two distinct data sources compete with one another for the potentially limited bandwidth of the network connection—thereby presenting the possibility that the store and forward transmission load will saturate the network connection, re-fill the data transmission cache, and cause the system to reenter the store and forward mode. This known arrangement achieves the desirable effect of preventing loss/dropping of data (assuming the store and forward FIFO buffer is not overrun) when the rate of receiving data for forwarding via a network interface exceeds the current available bandwidth of the network interface resulting in a backup of data to be transmitted via the network interface of a machine. However, entry into the store and forward mode of operation is generally considered an exceptional/undesirable event, and therefore should be avoided.

SUMMARY OF THE INVENTION

The present invention addresses the potential necessity of providing streaming data over a slow and/or intermittent network link without data loss (assuming the long-term average incoming data rate does not exceed the data transmission rate on the slow/intermittent network link). The present invention achieves this goal without sacrificing the timeliness of delivered information (assuming the link is operational)—even when a substantial quantity of data is backed up within a store and forward buffer due to a previous interruption of a connection through which process data is forwarded to a remote database server.

The above needs are addressed by a new networked node that incorporates a data acquisition service, and method for operating such node, for forwarding received process data to a process history database over a potentially slow and/or intermittent network connection. The networked node receives incoming process data through a first network interface associated with a first network connection and transmits outgoing process data through a second network interface associated with a second network connection.

A store and forward functionality within the networked node receives the incoming process data and forwards the outgoing process data to the second network interface. The disclosed store and forward functionality includes an immediate transmission cache and a store and forward storage. A store control directs the incoming process data to a selected one of the immediate transmission cache and the store and forward storage. The store control enters, in response to detecting an entry condition, an activated mode wherein incoming process data is directed to the store and forward storage. In a particular embodiment, the store control remains within the activated mode for at least a period of time corresponding to a configurable delay period parameter value.

A read control, of the store and forward functionality, forwards outgoing process data to the second network interface from the immediate transmission cache and store and forward storage. The read control includes at least a first configurable parameter that constrains a rate at which data retrieved from the store and forward storage is forwarded via the second network interface. In accordance with various embodiments of the invention, the rate is specified by a single value, multiple values, as a percentage of available throughput, as a remainder of available throughput (after reserving a first portion for forwarding data from the immediate transmission cache) for transmitting data via the second network connection.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

The present invention, and described embodiments thereof, provides a store and forward facility and method of operating such facility that ensures live streaming process data is transmitted to a remote storage location in a satisfactory manner. The store and forward control apparatus and method disclosed herein are capable of efficiently handling transmission of streaming process data over a variety of links exhibiting varying degrees of bandwidth and connectivity.

Store and forward facilities ensure against data loss. However, networked data transmission systems incorporating store and forward functionality also have their drawbacks. For example, short/frequent momentary network outages force switching between normal and store and forward data streaming modes at each outage for a few seconds. During each cycle from normal to store and forward to normal mode data handling modes of operation, short blocks of data are forwarded to the server along-side regular real-time data. If a process/thread associated with the store and forward memory empties the stored contents of the store and forward memory buffer, for transmission over a slow network connection, at an unregulated (high) rate, then the immediate transmission cache will again fill—causing the system to re-enter the store and forward mode again. Such toggling between normal and store/forward modes creates the impression of a continuing problem when, in fact, the network is simply being overloaded by an excessively large volume of data flowing over the network from the store/forward buffer. Thus, it is important to allow the newest information to be transmitted over a re-established connection without being excessively delayed by, or having to compete for limited bandwidth with, data transmissions from the store and forward buffer.

The present invention implements a number of enhancements to the aforementioned known store and forward methods/systems. One enhancement, forcing the system to stay within the store and forward mode for a configurable period of time—even after the condition that caused entry into the store and forward mode is no longer present, reduces excessive control packet traffic on the network. Another enhancement, limiting how much of an interface's network bandwidth can be allocated to transmitting data from the store and forward FIFO buffer, ensures that the most current streamed data is not unduly delayed by previously buffered (potentially stale) store and forward data when a connection is restored. Limiting the maximum rate at which a store and forward memory is emptied via a network data transmission interface also facilitates ensuring that, after a network interface (used by both the immediate transmission cache and the store/forward buffer) has been down for an extended period, the subsequent emptying of the store/forward buffer will not cause a backup of the immediate transmission cache that will force reentering the store and forward mode of operation.

Figure 1:
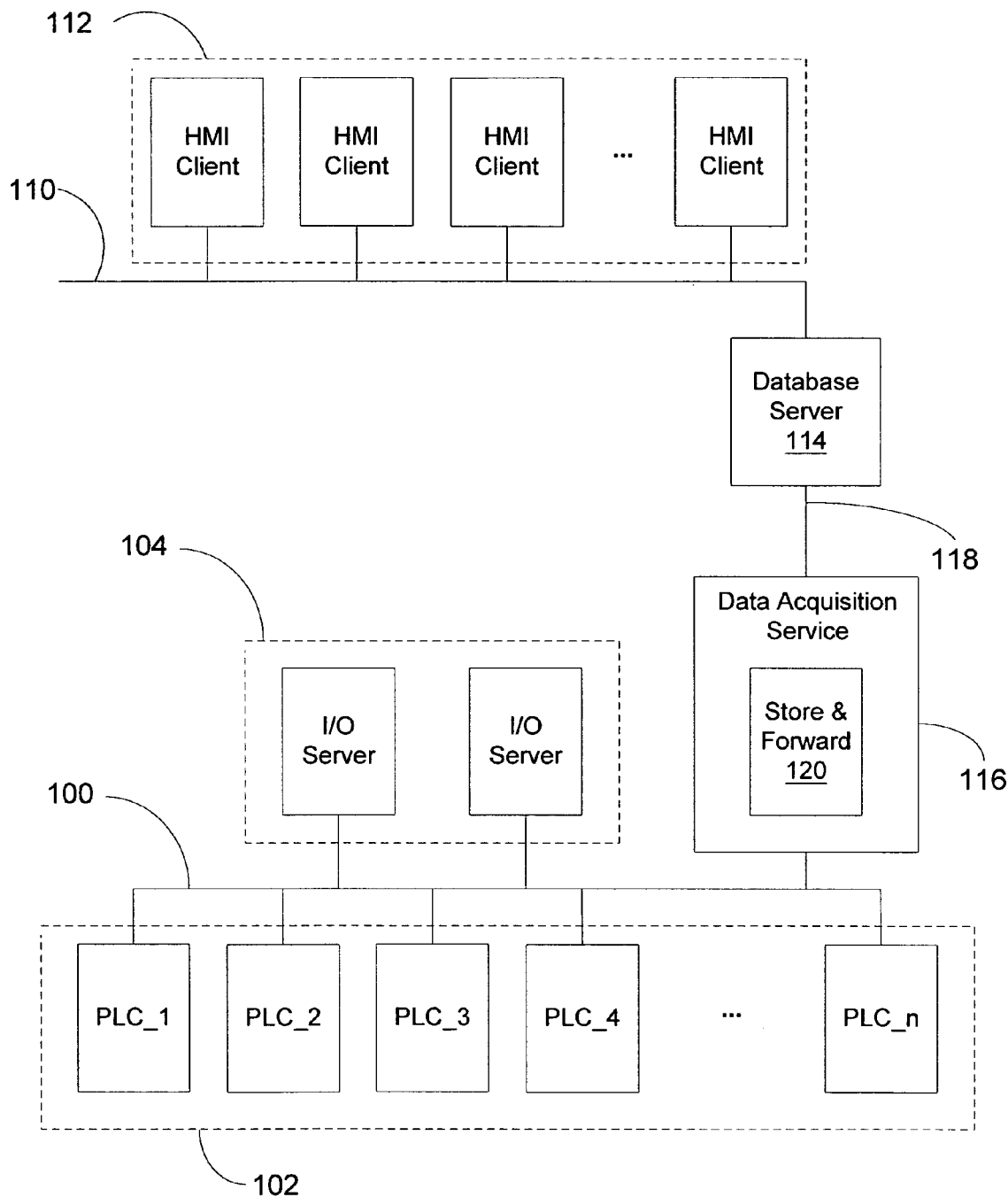
FIG. 1 is a schematic diagram of an exemplary networked environment wherein an embodiment of the present invention is advantageously incorporated.

The following description is based on illustrative embodiments of the invention and should not be taken as limiting the invention with regard to alternative embodiments that are not explicitly described herein. FIG. 1 schematically depicts an illustrative supervisory process control and management information network environment wherein the present invention is potentially incorporated. The network environment includes a plant floor network 100 to which a set of process control and manufacturing information data sources 102 are connected either directly or indirectly (via any of a variety of networked devices including concentrators, gateways, integrators, interfaces, etc.). The data sources 102 comprise, for example, a set of programmable logic controllers (PLCs) that are, in turn, coupled to sensors, actuators, etc. A set of I/O servers 104 (also referred to herein as data access servers) acquire data from the data sources 102 via the plant floor network 100.

The exemplary network environment includes a production network 110. In the illustrative embodiment the production network 110 comprises a set of human/machine interface (HMI) nodes 112 that execute plant floor visualization applications supported, for example, by Wonderware's InTouch HMI application management software. The data driving the visualization applications on the HMI nodes 112 is acquired, by way of example, from an industrial process control and manufacturing information database server 114 that also resides on the production network 110. The database server 114 includes historical plant status, configuration, event, and summary information. The database server 114 is sometimes referred to as a "historian" for process/plant operations.

Continuous, up-to-date, flow of streaming plant data between the data sources 102 and the database server 114 is very important for plant supervisors (both human and automated). Thus, in an embodiment of the present invention, a data acquisition service 116 is interposed between the I/O servers 104 and the database server 114. The data acquisition service 116 acquires and integrates data (potentially in a variety of forms) from a variety of data sources into a plant information database including time stamped data entries maintained by the database server 114.

The physical connection between the data acquisition service 116 and the I/O servers 104 can take any of a number of forms. For example, the data acquisition service 116 and the I/O servers 104 can comprise distinct nodes on a same network (e.g., the plant floor network 110). However, in alternative embodiments the I/O servers 104 communicate with the data acquisition service 116 via a network link that is separate and distinct from the plant floor network 100. In an illustrative example, the physical network links between the I/O servers 104 and the data acquisition service 116 comprise local area network links (e.g., Ethernet, etc.) that are generally fast, reliable and stable, and thus do not typically create/constitute a data stream bottleneck or source of intermittent network connectivity.

The connection between the data acquisition service 116 and the database server 114 can also take any of a variety of forms. In an embodiment of the present invention, the physical connection comprises an intermittent/slow connection 118 that is potentially: too slow to handle a burst of data, unavailable, or faulty. To guard against data loss in the event that the intermittent/slow connection 118 is unable to meet current data transmission needs to the database server 114, the data acquisition service comprises decision logic and data storage for implementing a store and forward function 120 (described further herein below with reference to FIG. 2). In general, a store and forward mode of the store and forward function 120 is invoked when the intermittent/slow connection 118 is unable to pass data as a sufficient rate to the database server 114. In an embodiment of the invention, the store and forward mode is entered when the data acquisition service 116 senses that a certain level of backed up data has been reached in its immediate data transmit cache. Once the store and forward mode is invoked, the received data is loaded onto the tail of a queue (FIFO) buffer maintained by the store and forward function 120. In accordance with an embodiment of the present invention, a number of user configurable variables are provided that facilitate tuning the operation of the store and forward function 120 to address design goals regarding controlling thrashing and ensuring that subsequently forwarding stored streaming data does not obstruct providing current process data. It is noted that while a single data acquisition service 116 is specified, alternative embodiments of the invention incorporate redundant configurations including multiple nodes capable of providing the services of the data acquisition service 116. Furthermore, the store and forward function 120 is potentially incorporated into a variety of servers/services interposed between a data source and a data sink, and wherein the connection between the node incorporating the store and forward function 120 and the data sink is potentially either a slow and/or intermittent connection.

Figure 2:
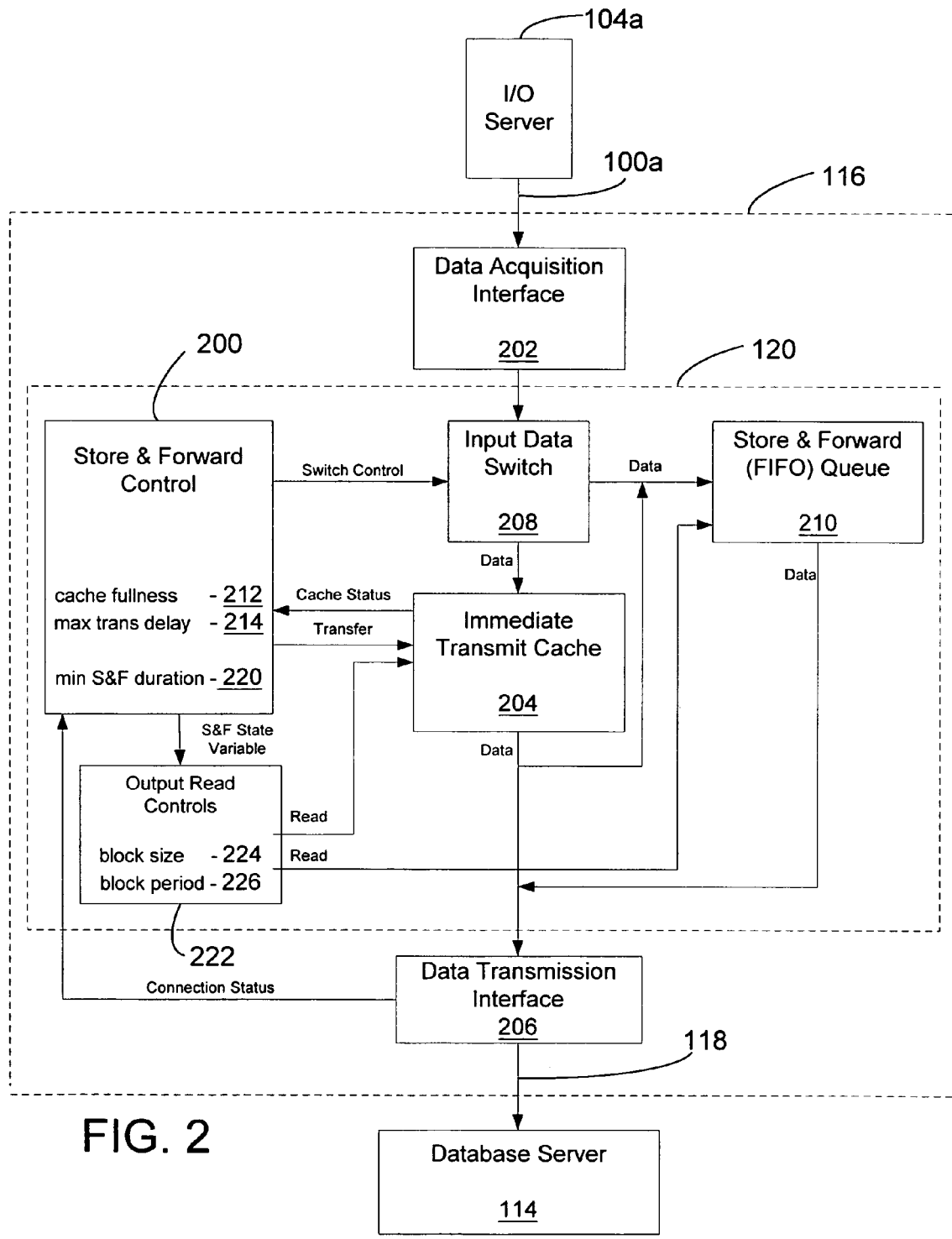
FIG. 2 is a schematic drawing of functional/structural aspects of a data acquisition service embodying the present invention.

Turning to FIG. 2 an exemplary schematic diagram depicts functional components associated with the store and forward function 120 implemented by the data acquisition service 116. The store and forward function 120 generally implements data stream diversion logic that facilitates preventing overflow of a data transmission cache as well as ensuring that data passed through the data transmission cache is not unduly delayed. An embodiment of the invention, described herein below, provides further refinements to this basic concept to minimize thrashing as well as provide a mechanism for clearing previously diverted data from a store and forward buffer. It will be appreciated by those skilled in the art that the depicted data acquisition service 116 has been simplified to focus upon data transmission control aspects of a store and forward control 200 of the store and forward function 120. Furthermore, the functional blocks depicted in FIG. 2 are potentially carried out in software, firmware, and/or hardware (or any combination thereof).

In an exemplary embodiment, the store and forward function 120 is interposed between a data acquisition interface 202 and an immediate transmit (FIFO) cache 204. A data transmission interface 206 passes the (previously acquired) data via the intermittent/slow connection 118 to the database server 114. The store and forward control 200 implements a user-configurable (tunable) algorithm ensuring the data acquisition service 116 operates satisfactorily under a variety of conditions including occasions where the intermittent/slow connection 118 cannot transmit data at a sufficient rate (including a rate of zero if the connection is down) to ensure that an incoming stream of data received from an I/O server 104a via link 100a is not unduly delayed prior to being output via the transmission interface 206 to the database server 114.

In an embodiment of the invention, the store and forward control 200 comprises a set of tunable store and forward control parameters that are incorporated into decision logic implemented by the store and forward control 200 that facilitate maintaining a certain degree of freshness in data passed from the data acquisition service 116 to the database server 114. By way of example, the store and forward function includes two user-configurable activation threshold parameters that specify when the store and forward control 200 enters a store and forward mode of operation, transfers the current contents of the immediate transmit cache 204 to a store and forward (FIFO) queue 210, and signals an input data switch 208 to route data acquired from the data acquisition interface 202 to the store and forward (FIFO) queue 210. A first activation threshold parameter specifies a cache fullness value 212 (an absolute quantity of cached data, a percentage of the immediate transmit cache 204 capacity, etc.). A second activation threshold parameter specifies a maximum transmission delay value 214 (e.g., 15 seconds). The maximum transmission delay value 214, by way of example, establishes an upper limit on a time period that passes between when a data item is initially received by the data acquisition service 116 and placed directly into the immediate transmit cache 204, and when the cached data is thereafter transmitted to the database server 114 via the data transmission interface 206. Other transmission delay measures are utilized in accordance with alternative embodiments of the store and forward control 200. If this time delay becomes too large (e.g., 15 seconds) or the volume of stored data exceeds the cache fullness value 212, then the data acquisition service 216 enters the store and forward mode. Upon entering the store and forward mode the contents of the immediate transmit cache 204 are transferred to the store and forward queue 210, and incoming data is diverted by the switch 208 to the store and forward queue 210. Thus, in this exemplary embodiment at least the initially triggering condition is removed by clearing the immediate transmit cache 204.

In an exemplary embodiment, the store and forward control 200 remains within the store and forward mode of operation until a set of exit conditions are achieved. First, the connection 118 must be operational. If the connection 118 failed, which in turn caused the data to accumulate within the immediate transmit cache 204 to a store and forward mode-triggering level, then the store and forward mode will not be exited until the connection 118 has been re-established. Furthermore, to prevent excessive toggling between the normal mode and the store and forward mode, in an embodiment of the invention, a minimum store and forward duration value 220 specifies a minimum time duration for staying in the "store and forward" mode once the store and forward control 200 has entered the store and forward mode of operation. Alternatively, or in combination with a minimum time duration, a "transmitted data" counter is used by the control 200 to impose a delay period (specified, for example by a transmitted byte count value) before exiting the store and forward mode of operation. Therefore, the data acquisition service 116 will remain within the store and forward mode of operation for at least the minimum period (measured by time and/or data count) regardless of whether the connection 118 becomes operational before the minimum period expires.

The contents of the immediate transmit cache 204 are handled differently in alternative embodiments of the data acquisition service. In the above-described embodiment, the immediate transmit cache 204 is completely emptied upon entry of the data acquisition service 216 into the store and forward mode. However, in an alternative embodiment the immediate transmit cache 204 contents are not transferred to the store and forward queue 210. In yet other embodiments only a portion of the data (e.g., the oldest) is transferred from the immediate cache 204 to the store and forward queue 210. In still yet other embodiments, the data transfer from the immediate cache 204 to the store and forward queue 210 is governed by control logic tied to events/conditions (e.g., the connection failed, the connection saturated, etc.) that triggered the store and forward mode.

The above discussion of parameters utilized by the store and forward control 200 has focused upon controlling the input data switch 208 and copying contents of the immediate transmit cache 204 to the store and forward queue 210. Turning attention to the portions of the data acquisition service 116 that govern retrieving previously cached/queued data for output via the data transmission interface 206, in an exemplary embodiment, output read controls 222 retrieve previously queued data from the immediate transmit cache 204 and the store and forward queue 210, and pass the retrieved data to the data transmission interface 206 coupled to the intermittent/slow connection 118. The output read controls 222 initiate reading previously stored data from the immediate transmit cache 204 or the store and forward queue 210, packaging the data in appropriate packets and passing the packaged units of data to the data transmission interface 206. It is emphasized that the read controls 222 are potentially implemented by software, firmware, and/or hardware including any combination of these potential forms of logic implementation means.

In an embodiment of the present invention, the operation of a portion of the output read controls 222 that is responsible for retrieving and passing data from the store and forward queue 210 includes tunable parameters that define an average rate at which data is removed from the store and forward queue 210 for transmission via the data transmission interface 206 to the database server 114. Such tuning facilitates ensuring that forwarding previously stored data from the store and forward queue 210 will not saturate the connection 118—a condition that potentially causes data to accumulate within the immediate transmit cache 204 and trigger reentering the store and forward mode.

In a particular embodiment of the invention, the tunable parameters for limiting the flow of data previously stored within the store and forward queue 210 comprise a block size parameter 224 and a block read period parameter 226. The block size parameter 224 specifies a value corresponding to the maximum size of a segment of data retrieved from the (non-empty) store and forward queue 210. The block read period parameter 226 specifies a repetition period that governs scheduling the initiation of a task that retrieves a segment of data (up to the maximum size specified by the block size parameter 224) from the store and forward queue 210 for submission to the data transmission interface 206. The block size parameter 224 and block read period 226 are incorporated into the operation of the output read controls 222 such that a segment of data, up to the maximum size specified by the block size parameter 224, is retrieved from the queue 210 for transmission during each such period. Thus, specifying a block size of 1 Kbytes for the block size parameter 224 and a block read period of 2 seconds for the block read period parameter results in a maximum retrieval/forwarding rate of 500 bytes per second from a non-empty store and forward queue 210. Alternatively the block size parameter 224 and block read period parameter 226 do not require a specific block size and repetition period. Instead, the block size and period parameters merely define a rate, and it is up to the output read controls 222 to determine how to achieve the rate. For example, a block size parameter 224 of 2 Kbytes and a block read period 226 of 0.5 seconds can be implemented by the output read controls 222 by retrieving no more than 4 Kbytes of data every second—regardless of how this rate is achieved.

There are a variety of ways for specifying an upper bound for the rate at which the output read controls 222 retrieve/forward buffered data from the store and forward queue 210. In an above-described embodiment, the retrieval rate has been specified by a combination of a maximum retrieved block size (the block size parameter 224) and a repetition/delay period (the block read parameter 226) for the task that retrieves/forwards a segment of data from the store and forward queue 210. However, in alternative embodiments the average rate at which the data is retrieved/forwarded is governed by a differing set of parameters that operate to limit the rate at which data previously stored within the store and forward queue 210 is forwarded via the connection 118. For example, rather than explicitly specifying a maximum data block size and period associated with retrieving a block of data up to the block size (described hereinabove), an average data rate is specified by a single value (e.g., "N" bytes/second), and the output read controls 222 fulfill that rate limitation by separately calculating a block size and repetition period that substantially corresponds to the data rate specified by the single value. In other embodiments, the rate is expressed as a percentage of a current maximum data rate specified for the connection 118. In yet other embodiments the data rate is specified as a difference between the data rate for the connection 118 and a data rate reserved for forwarding data from the immediate transmit cache 204. Such methods may indeed be preferred in the case of dial-up connections where the connection quality potentially differs in each instance where the connection 118 is established between two modems over public switched telephone network lines.

In yet another embodiment an adaptive rate is specified, by a user, that adjusts the rate of forwarding data from the store and forward queue based upon the currently sensed quantity and/or delay of data in the immediate transmit cache 204. In a simplest case, the user merely activates/deactivates such forwarding mode. In other embodiments, the user specifies parameters defining/tuning processes that determine the adaptive response of the forwarding rate to sensed parameters (e.g., the speed of the connection 118, the data delay and/or data quantity of the immediate transmit cache 204). Thus, if the immediate transmit cache 204 is nearly empty, then the task for forwarding data from the store and forward queue 210 retrieves/forwards data at a high rate. However, as the cache 204 fills, the retrieval/forwarding rate is lowered to delay/avoid reentering the store and forward mode of operation.

It is noted that the above-described functionality of the output read controls 222 is carried out by one or more entities carried out in any of a variety of forms. For example, while shown within a single block within the schematic diagram set forth in FIG. 2, in an exemplary embodiment the output read controls 222 comprise two distinct functional entities (e.g., processes/threads/modules). One entity handles data retrieval from the immediate transmit cache 204, and the other entity handles data retrieval from the store and forward queue 210. Each of the two distinct entities operates independently of the other and, as demonstrated above, each entity operates according to its own distinct data retrieval control logic. A supervisory/scheduler process manages/controls the two independently operating data retrieval processes. In an alternative embodiment the two above-described data distinct retrieval operations for retrieving data from the cache 204 and buffer 210 are carried out by a single entity.

Figure 3:
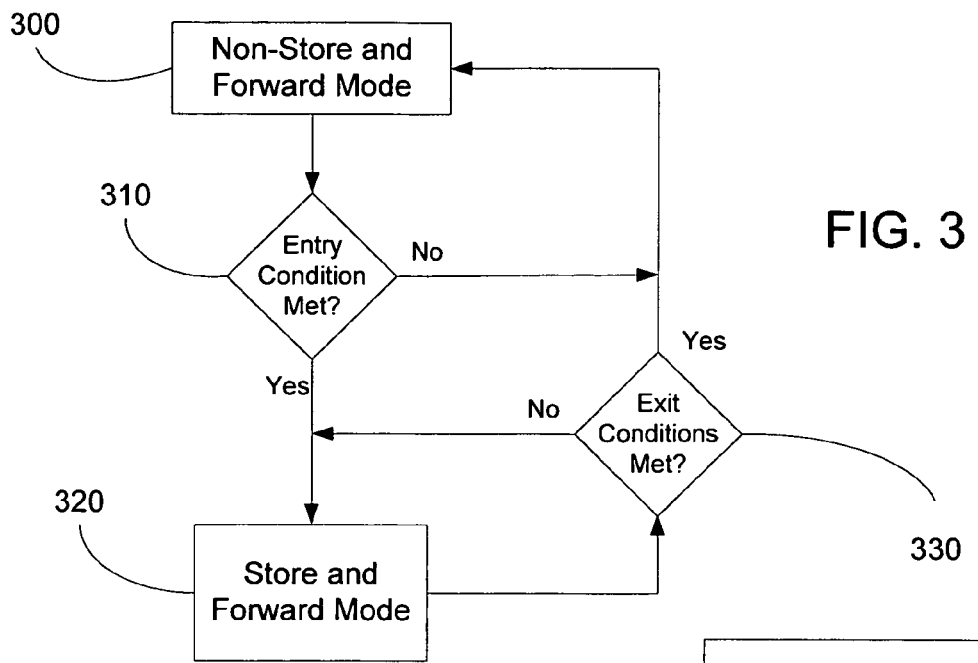
FIG. 3 is a flow/state diagram depicting the operational modes and entry/exit conditions of an exemplary control scheme for selectively redirecting a stream of incoming data to a store and forward queue.

Having described an exemplary functional/structural arrangement of a store and forward function 120, attention is directed to a set of flow/state diagrams summarizing the operation of the store and forward function 120. Turning to FIG. 3, an exemplary set of steps/stages are depicted that summarize the operation of the store and forward control 200. During stage 300, wherein the control 200 is operating in a non-store and forward mode, the control 200 causes the input data switch 208 to pass data into the immediate transmit cache 204. The control 200 periodically performs a threshold test at 310, and remains within stage 300 until one of the aforementioned threshold values, stored within the cache fullness value 212 (e.g., 50 percent full) and the maximum transmission delay value 214 (e.g., 15 seconds), is met.

If at test step 310 one of the store and forward mode conditions are met, then control 200 enters a store and forward stage 320. During stage 320, the control 200 initially resets a store and forward timer based upon the minimum store and forward duration value 220. This establishes the minimum period within which the control will operate in the store and forward mode—even if the threshold is no longer exceeded. The contents of the immediate transmit cache 204 are transferred to the store and forward queue 210.

Thereafter, at the store and forward stage 320 the store and forward control 200 periodically tests, during step 330, whether conditions have been met for exiting the store and forward mode. In the exemplary embodiment, exit conditions are met when: (1) the connection 118 is confirmed to be operational, and (2) the period specified by the minimum store and forward duration value 220 has expired. The store and forward timer period expiration test is included in embodiments of the invention to ensure that a minimum period of time elapses before the control 200 returns to its non-store and forward mode of operation. Because the cache 204 is emptied upon entry into the store and forward mode, there is no need to include any tests associated with the quantity of data stored within the cache 204.

In an exemplary embodiment, retrieving/forwarding data from the store and forward queue 210 is not halted during the delay period specified by the minimum store and forward duration value 220 when the control 200 initially enters the store and forward mode. If the connection 118 is determined to be operational, then data is retrieved from the store and forward queue 210 and forwarded via connection 118 while the control 200 operates within the store and forward mode 320.

If at test step 330 all of the exit conditions are met, then the control 200 enters the non-store and forward mode associated with stage 300. However, if one of the exit conditions is not met (e.g., either the timer has not expired or the connection 118 is still not operational), then the control 200 continues to operate within the store and forward stage 320.

Figure 4:
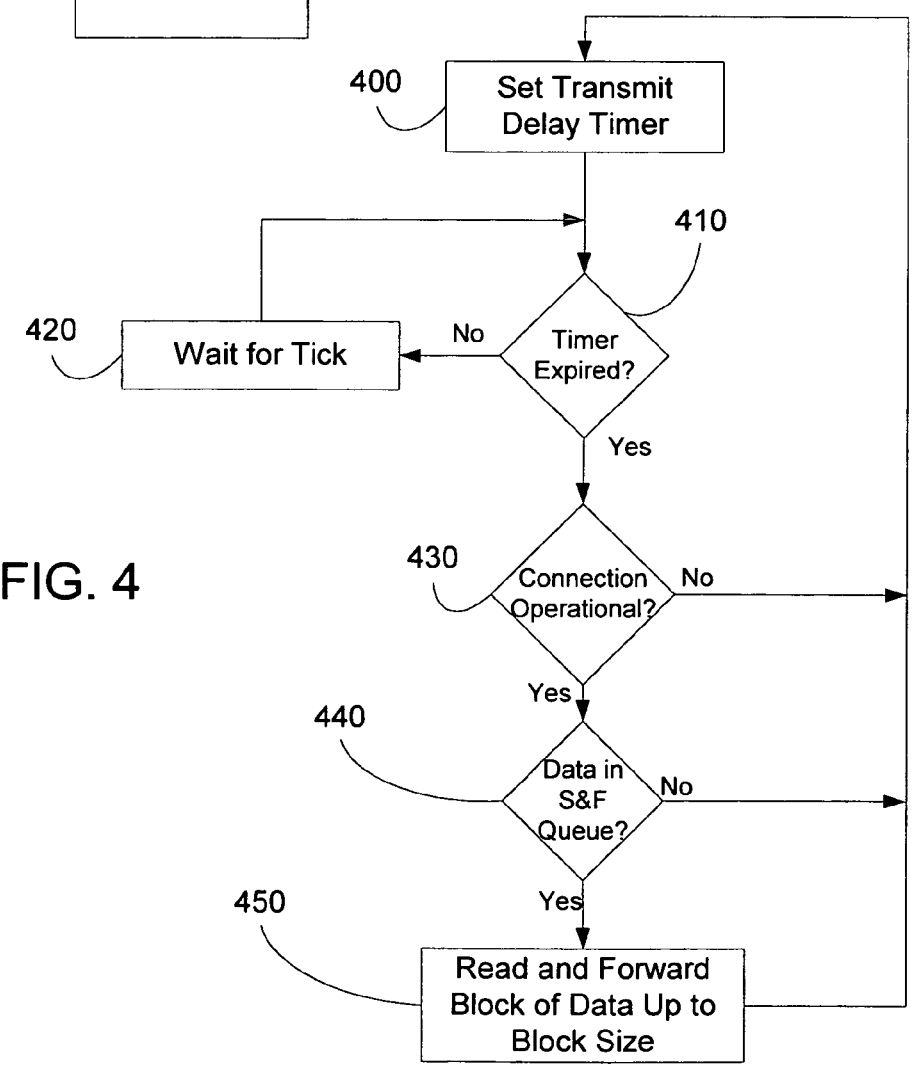
FIG. 4 is a flowchart depicting a set of operations and conditional tests performed by a controller that selectively initiates reading/forwarding blocks of data previously stored in a store and forward queue.

Turning to FIG. 4, an exemplary set of steps/stages are depicted that summarize the operation of the portion of the output read controls 222 that is responsible for retrieving/forwarding data from the store and forward queue 210. In an embodiment of the invention, if the store and forward control 200 is at the non-store and forward stage 300 and previously re-directed data is stored within the store and forward queue 210, then the output read control 222 periodically causes a block of data to be transmitted from the store and forward queue 210. As mentioned previously above, the rate at which data is retrieved and transmitted from the store and forward queue 210 is tuned through specifying, via a configuration user interface, values for the block size 224 and the block read period 226. In an alternative embodiment of the invention, either one or both of the values for the block size 224 and the block read period 226 are automatically/dynamically re-assigned during operation of the data acquisition service 116 in response to performance parameters (e.g., immediate transmit cache fullness and/or transmission delays) approaching a store and forward triggering threshold. In this embodiment, automatically limiting/restricting the forwarding of data previously re-directed to the store and forward queue 212 will potentially avert entering the store and forward mode of the control 200 in cases where the combined data transmission load created by forwarding data from both the immediate transmit cache 204 and the store and forward queue 212 exceeds the current data transmission capabilities of the connection 118.

During stage 400, a transmit delay timer associated with the output read control 222 is loaded with the user configurable block read period 226 value. As previously explained, the forwarding of data previously diverted to the store and forward queue 210 occurs periodically. In the illustrative example, the delay applied as an initial condition (i.e., before any other tests). However, in alternative embodiments, the delay period between transmitting a block of data from the store and forward queue 210 is carried out in a variety of ways including, for example, only enforcing the delay after a block of data from the queue 210 is actually transmitted.

After setting the transmit delay timer, as illustratively depicted in steps 410 and 420 the delay timer is tested to determine whether the delay specified by the block read period 226 value has expired. When the delay timer period expires, control passes from step 410 to step 430 wherein a further test is performed based upon the current state of the connection 118. In particular, the connection 118 must be operational in order for data to be forwarded from the store and forward queue 210. In the illustrative embodiment, blocks are forwarded from the queue 210 to the database server via the data transmission interface 206 only if the connection 118 is operational. Therefore, if the connection is not operational, then control returns to step 400 to initiate another wait cycle before testing the mode of control 200. It is noted that the test performed during step 430 is potentially performed in any one of multiple possible stages of the set of steps recited in FIG. 4. If the connection 118 is operational, then control passes to step 440.

During step 440, a determination is made whether any data is currently stored in the store and forward queue 210. If no data is present, then control returns to step 400 (or alternatively, the operation associated with forwarding data from the queue 210 is halted until data is again present in the queue 210). However, if data is present, then control passes to step 450. At step 450 the output read controls 222 enable a read request to be passed to the queue 210 thereby initiating transferring a block of data (up to the size specified by the block size 224) from the store and forward queue 210 to the database server 114. Control thereafter passes to step 400 and a wait period equal to at least the block read period 226 is enforced. Thus, in conclusion, the output read controls 222 enforce an interface/link resource sharing algorithm that limits the portion of total bandwidth allocated to forwarding time stamped data previously stored in the queue 210. In the exemplary embodiment set forth in FIG. 2, the store and forward control 200 facilitates tuning an effective data transmission rate (by specifying values for the block size 224 and the block read period 226) such that the data acquisition service 116 is less likely to enter a store and forward mode of operation as a result of overloading the connection 118 while clearing the queue 210 of previously redirected data.

In view of the many possible embodiments to which the principles of this invention may be applied, it should be recognized that the embodiments described herein with respect to the drawing figures, as well as the described alternatives, are meant to be illustrative only and should not be taken as limiting the scope of the invention. The functional components disclosed herein can be incorporated into a variety of programmed computer systems in the form of software, firmware, and/or hardware. Furthermore, the illustrative steps may be modified, supplemented and/or reordered without deviating from the invention. Therefore, the invention as described herein contemplates all such embodiments as may come within the scope of the following claims and equivalents thereof.

What is claimed is:

1. A networked node incorporating a data acquisition service for forwarding received process data to a process history database over a potentially slow and/or intermittent network connection, the data acquisition service comprising:
   a first network interface for receiving incoming process data via a first network connection;
   a second network interface for transmitting outgoing process data via a second network connection; and
   a store and forward functionality that receives the incoming process data and forwards the outgoing process data, the store and forward functionality comprising:
      an immediate transmission cache,
      a store and forward storage,
      a store control for directing the incoming process data to a selected one of the immediate transmission cache and the store and forward storage, wherein the store control enters, in response to detecting an entry condition, an activated mode wherein incoming process data is directed to the store and forward storage, and
      a read control for forwarding outgoing process data to the second network interface from the immediate transmission cache and store and forward storage, the read control comprising at least a first configurable parameter that constrains a rate at which data retrieved from the store and forward storage is forwarded via the second network interface.

2. The networked node of claim 1 wherein the store and forward functionality further comprises a delay timer, and wherein the store control stays within the activated mode at least until the delay timer waits a period of time corresponding to a minimum store and forward period value.

3. The networked node of claim 2 wherein the minimum store and forward duration parameter value is user configurable.

4. The networked node of claim 1 wherein the at least first configurable parameter specifies an effective rate for forwarding outgoing process data from the store and forward storage.

5. The networked node of claim 4 wherein the at least first configurable parameter comprises a delay period parameter corresponding to a delay interposed between sequentially executed tasks associated with retrieving and transmitting blocks of data from the store and forward storage.

6. The networked node of claim 5 wherein the at least first configurable parameter comprises a block size parameter corresponding to a maximum quantity of data retrieved and forwarded from the store and forward storage by the read control during the delay period.

7. The networked node of claim 1 wherein at least one of the at least first configurable parameter is user configurable.

8. The networked node of claim 1 wherein a maximum level for the rate at which data retrieved from the store and forward storage is forwarded via the second network interface is automatically adjusted based upon one or more of a set of operating conditions including:
   a level of data stored within the immediate transmission cache; and
   a transmission delay encountered by data buffered in the immediate transmission cache.

9. The networked node of claim 1 wherein the read control includes logic for transferring outgoing process data from the immediate transmission cache to the store and forward storage when the store control enters the activated mode.

10. The networked node of claim 3 wherein the detected entry condition relates to one of either a level of data stored within the immediate transmission cache or a transmission delay encountered by data buffered in the immediate transmission cache.

11. The networked node of claim 3 wherein the store control maintains the activated mode until a set of exit conditions are met that include:
   the minimum period of time has expired, and
   a connection is established for forwarding data from the immediate transmission cache via the second network interface.

12. A method, executed within a networked node incorporating a data acquisition service, for forwarding received process data to a process history database over a potentially slow and/or intermittent network connection, the method comprising:
   receiving, by a first network interface, incoming process data via a first network connection;
   receiving, by a store and forward functionality including an immediate transmission cache and a store and forward storage, the incoming process data;

directing, by a store control of the store and forward functionality, the incoming process data to a selected one of the immediate transmission cache and the store and forward storage, wherein the store control enters, in response to detecting an entry condition, an activated mode wherein incoming process data is directed to the store and forward storage;

forwarding, by a read control of the store and forward functionality, outgoing process data to a second network interface from the immediate transmission cache and store and forward storage, the read control comprising at least a first configurable parameter that constrains a rate at which data retrieved from the store and forward storage is forwarded via the second network interface; and transmitting, by the second network interface, outgoing process data via a second network connection.

13. The method of claim 12 wherein the store and forward functionality further comprises a delay timer, and wherein the method further comprises:

waiting, by the store control, within the activated mode at least until the delay timer measures a period of time corresponding to a minimum store and forward period value.

14. The method of claim 13 wherein the minimum store and forward duration parameter value is user configurable.

15. The method of claim 12 wherein the at least first configurable parameter specifies an effective rate for forwarding outgoing process data from the store and forward storage.

16. The method of claim 15 wherein the at least first configurable parameter comprises a delay period parameter corresponding to a delay interposed between sequentially executed tasks associated with retrieving and transmitting blocks of data from the store and forward storage.

17. The method of claim 16 wherein the at least first configurable parameter comprises a block size parameter corresponding to a maximum quantity of data retrieved and forwarded from the store and forward storage by the read control during the delay period.

18. The method of claim 12 wherein at least one of the at least first configurable parameter is user configurable.

19. The method of claim 12 wherein a maximum level for the rate at which data retrieved from the store and forward storage is forwarded via the second network interface is adjusted based upon one or more of a set of operating conditions including:

a level of data stored within the immediate transmission cache; and a transmission delay encountered by data buffered in the immediate transmission cache.

20. The method of claim 12 further comprising:

transferring outgoing process data from the immediate transmission cache to the store and forward storage when the store control enters the activated mode.

21. The method of claim 14 wherein the detected entry condition relates to one of either a level of data stored within the immediate transmission cache or a transmission delay encountered by data buffered in the immediate transmission cache.

22. The method of claim 14 further comprising maintaining, by the store control, the activated mode until a set of exit conditions are met that include:

the minimum period of time has expired, and a connection is established for forwarding data from the immediate transmission cache via the second network interface.

23. A computer-readable medium including computer-executable instructions, executed within a networked node incorporating a data acquisition service, for forwarding received process data to a process history database over a potentially slow and/or intermittent network connection, the computer-executable instructions facilitating performing the steps of:

receiving, by a first network interface, incoming process data via a first network connection;

receiving, by a store and forward functionality including an immediate transmission cache and a store and forward storage, the incoming process data;

directing, by a store control of the store and forward functionality, the incoming process data to a selected one of the immediate transmission cache and the store and forward storage, wherein the store control enters, in response to detecting an entry condition, an activated mode wherein incoming process data is directed to the store and forward storage;

forwarding, by a read control of the store and forward functionality, outgoing process data to a second network interface from the immediate transmission cache and store and forward storage, the read control comprising at least a first configurable parameter that constrains a rate at which data retrieved from the store and forward storage is forwarded via the second network interface; and transmitting, by the second network interface, outgoing process data via a second network connection.

24. The computer-readable medium of claim 23 wherein the store and forward functionality further comprises a delay timer, and wherein the computer-executable instructions facilitate:

waiting, by the store control, within the activated mode at least until the delay timer measures a period of time corresponding to a minimum store and forward period value.

25. The computer-readable medium of claim 24 wherein the minimum store and forward duration parameter value is user configurable.

26. The computer-readable medium of claim 23 wherein the at least first configurable parameter specifies an effective rate for forwarding outgoing process data from the store and forward storage.

27. The computer-readable medium of claim 26 wherein the at least first configurable parameter comprises a delay period parameter corresponding to a delay interposed between sequentially executed tasks associated with retrieving and transmitting blocks of data from the store and forward storage.

28. The computer-readable medium of claim 27 wherein the at least first configurable parameter comprises a block size parameter corresponding to a maximum quantity of data retrieved and forwarded from the store and forward storage by the read control during the delay period.

29. The computer-readable medium of claim 23 wherein at least one of the at least first configurable parameter is user configurable.

30. The computer-readable medium of claim 23 further comprising computer-executable instructions facilitating adjusting a maximum level for the rate at which data retrieved from the store and forward storage is forwarded via the second network interface based upon one or more of a set of operating conditions including:

a level of data stored within the immediate transmission cache; and a transmission delay encountered by data buffered in the immediate transmission cache.

31. The computer-readable medium of claim 23 further comprising computer-executable instructions facilitating:

transferring outgoing process data from the immediate transmission cache to the store and forward storage when the store control enters the activated mode.

32. The computer-readable medium of claim 25 wherein the detected entry condition relates to one of either a level of data stored within the immediate transmission cache or a transmission delay encountered by data buffered in the immediate transmission cache.

33. The computer-readable medium of claim 25 further comprising computer-executable instructions facilitating:

maintaining, by the store control, the activated mode until a set of exit conditions are met that include:

the minimum period of time has expired, and a connection is established for forwarding data from the immediate transmission cache via the second network interface.

* * * * *